United States Patent [19]
Bergmans

[11] Patent Number: 5,311,558
[45] Date of Patent: May 10, 1994

[54] DATA RECEIVER COMPRISING A CONTROL LOOP WITH REDUCED SAMPLING FREQUENCY

[75] Inventor: Johannes W. M. Bergmans, Eindhoven, Netherlands

[73] Assignee: U.S. Philips Corporation, New York, N.Y.

[21] Appl. No.: 848,810

[22] Filed: Mar. 10, 1992

[30] Foreign Application Priority Data

Mar. 15, 1991 [EP] European Pat. Off. ........ 91200563.4

[51] Int. Cl.$^5$ .............................................. H04B 1/10
[52] U.S. Cl. ...................................... 375/99; 375/101; 375/14; 370/32.1
[58] Field of Search ...................... 375/14, 34, 94, 99, 375/101, 102; 370/32.1; 379/410, 411

[56] References Cited

U.S. PATENT DOCUMENTS

| | | | |
|---|---|---|---|
| 4,564,952 | 1/1986 | Karabinis et al. | 375/101 |
| 4,905,254 | 2/1990 | Bergmans | 375/101 |
| 4,959,845 | 9/1990 | Tol et al. | 375/106 |
| 5,163,044 | 11/1992 | Golden | 379/411 |

FOREIGN PATENT DOCUMENTS

0065796 12/1982 European Pat. Off. ........ H04B 3/23

OTHER PUBLICATIONS

IEEE Trans. on Communications, Sep. 1982, p. 18.
"Line Coding for Digital Data Transmission", Telecom Australia Research Laboratories, vol. 11, No. 2, 1977, pp. 14–27.
R. W. Lucky, "Techniques for Adaptive Equalization of Digital Communications Systems", The Bell Technical Journal, Feb. 1966, pp. 255–286.
"Two New Ternary Line Codes", Electronic Letters, 22nd Nov. 1990, vol. 26, No. 24, pp. 1989–1990.
T. A. C. M. Claasen & W. F. J. Mecklenbrauker, "Comparison of the Convergence of Two Algorithms for Adaptive FIR Digital Filters", IEEE Transactions on Circuits and Systems, vol. CAS-28, No. 6, Jun. 1981, pp. 510–518.

Primary Examiner—Stephen Chin
Assistant Examiner—Don N. Vo
Attorney, Agent, or Firm—Anne E. Barschall

[57] ABSTRACT

For reducing the complexity of adaptive systems such as equalizers, echo cancellers and clock recovery systems, errors are often determined only once per n samples, where n is an integer. If the input signal of such an adaptive system comprises cyclostationary components, it may occur that the adaptive system does not converge to a desired value. By selecting n in such a way that the greatest common divisor of n and the cyclostationary period m of the input signal is equal to 1, convergence of the adaptive system is ensured.

8 Claims, 5 Drawing Sheets

DATA RECEIVER COMPRISING A CONTROL LOOP WITH REDUCED SAMPLING FREQUENCY

BACKGROUND OF THE INVENTION

The invention relates to a data receiver comprising an adaptive system for estimating at least one measure of a characteristic quantity of an input signal applied to an input of the data receiver, which adaptive system includes:

error determining means for determining an error in the estimate of the measure of the characteristic quantity of the input signal;

adapting means for adapting at discrete instants the estimate of the measure of the characteristic quantity of the input signal;

in which the input of the data receiver is coupled to a first input of the error determining means;

for providing the error an error output of the error determining means is coupled to an input of the adapting means for periodically conveying the error with a period nT, where n is an integer and T a rational fraction ($\leq 1$) of an interval between received symbols;

at least one output of the adapting means, the output having an output signal which forms a measure of the characteristic quantity of the input signal, is coupled to a second input of the error determining means;

the adapting means adapt their output signal at discrete instants in order to minimize the error.

An adaptive system of this type is known from European Patent Specification 0 065 796.

When signals are transmitted by way of a transmission medium, for example, a subscriber line of the public telephone network, or stored on a recording medium, for example, a magnetic tape or disc, it is generally necessary when these signals are received or reproduced respectively, to process the received signals before the desired output signals are present.

The necessary signal processing is usually determined by the properties of the transmission or recording medium respectively, such as, for example, the frequency characteristic, by the properties of the signal itself, such as, for example, the spectral power density, or by the properties of any occurring interfering signals, such as, noise or cross talk.

If said properties of the medium, of the signal or of the interfering signals are known in advance, and do not change with time, the signal processing necessary for obtaining the desired output signal may be performed in a standard manner.

Usually, however, these properties will not be known in advance or will change with time. The use of a system that performs the necessary signal processing in a standard manner, will generally not lead to an optimum recovery of the desired output signal.

In order to avoid this, adaptive systems are often used which are capable of adapting the signal processing to the properties of the transmission channel, to the properties of the transmitted signals or to the interfering signals.

Examples of suchlike systems are adaptive equalizers, adaptive echo cancellers and clock recovery systems. These systems comprise an error determining unit which derives an error from both the input signal and the estimate of a characteristic quantity of the input signal, which error is a measure for the deviation of the estimated characteristic quantity of the input signal relative to the real characteristic quantity of the input signal. A characteristic quantity may be, for example, the intersymbol interference, cross talk or echoes present in the input signal.

If the characteristic quantity of the input signal relates to properties of an interfering signal present in that input signal (for example, echoes or intersymbol interference), this interfering signal may be cancelled with the aid of a signal processing unit controllable by means of the estimate of the characteristic quantity, so that an output signal may be obtained which is substantially free from that interfering signal.

In the receiver according to the state of the art as shown in FIG. 1, the characteristic quantity to be estimated of the input signal is an echo of the signal transmitted by the station concerned and present in this input signal. This echo signal is caused by cross talk of the hybrid circuit B and reflection of the transmitted signal in the remote-end hybrid circuit. This echo signal is represented by the parameter values of the filter E in the adaptive system which values are necessary for obtaining a replica of this echo signal. C indicates a transmission path, and arrows along this path denote a unidirectional send and receive path respectively.

In the data receiver comprising the echo canceller according to the state of the art as shown in FIG. 1, the error determining unit comprises the digital filter E, the D/A converter F, the filter G, the subtractor circuit H, the sample-and-hold circuit S and the section of the circuit Q in which the error is determined on the basis of the input signals of the circuit Q. On the basis of the error $\hat{r}(t)$ the estimate of the characteristic quantity of the input signal may now be adapted for error minimization. In the known data receiver this adaptation is performed by the adapting means Q adapting the parameters of the filter E on the basis of the signal $\hat{r}(i)$ derived from the error $\hat{r}(t)$ by means of the A/D converter N and switch P.

Generally, the error is determined periodically with a period T, and a desired adaptation of parameters of the signal processing unit is made. Thus, every T seconds an adaptation of these parameters is made.

The receiver according to the state of the art further comprises a multiplier XM with a multiplying factor M, and a low-pass filter D. Symbols and signals are indicated by a(k) and b(k), and e(t), r(t) and s(t) respectively. A clock signal is indicated by $1/T_s$.

The block 10 represents a data signal source producing data symbols a(k), wherein k represents the number of the data signal, which data symbols occur at a rate of 1/Ts symbols/sec., wherein Ts represents the interval in sec. between data symbols.

In order to restrict the complexity of suchlike adaptive systems, the estimate of the characteristic quantity is not adapted periodically with the period T in the receiver known from afore-mentioned Patent Specification, but this is effected with a period nT on the basis of the error periodically determined with a period nT. This is often permissible because the characteristic quantity of the input signal often shows only slow changes with time. In the data receiver according to the state of the art the sample-and-hold circuit S takes a sample of the difference signal not more than once per nT seconds. At lower transmission rates this value of n may be, for example, 10, but at extremely high transmission rates n may, for example, exceed 1000.

Experiments have shown that convergence to a minimum difference between the estimated characteristic quantity of the input signal and the real characteristic quantity of the input signal fails to occur in several adaptive systems according to the preamble.

SUMMARY OF THE INVENTION

It is an object of the invention to provide an adaptive system according to the preamble in which the convergence to a minimum difference between the estimated characteristic quantity of the input signal and the real characteristic quantity of the input signal is guaranteed.

For this purpose, the invention is characterized in that the data receiver comprises a decoder for decoding a code that gives rise to a cyclostationary data signal having a cyclostationary period mT, where m is an integer, and in that the greatest common divisor (GCD) of n and m is equal to 1.

The invention is based on the recognition that optimum convergence fails to occur only when the input signal comprises cyclostationary components. A signal is cyclostationary if the statistical properties, such as, for example, mean value or autocorrelation function, periodically depend on time. An important example of a cyclostationary signal is the output signal of a block coder in which successive series of p input signals are converted into successive series of q output signals.

If the signal is cyclostationary with period mT, and the estimate of the characteristic quantity of the input signal is adapted not more than once per nT seconds, it is possible that not only several phases of the cyclostationary signal are sampled. For example, let us assume that m is equal to 6 and n is equal to 9. The cyclostationary signal has then 6 phases (rank numbers 0 to 5) which have different statistical properties. Let us assume that at a given instant a sampling instant nT corresponds to the phase of rank number 0 of the cyclostationary signal. The sampling instant (n+1)T will correspond to the phase of rank number (0+9) mod 6=3. The sampling instant (n+2)T will coincide with the phase of rank number (3+9) mod 6=0. The next sampling instant will again coincide with the phase 3 and so on.

It appears that information from only two out of six phases of the cyclostationary signal has an influence on the adaptation process. This is caused by the fact that the GCD of 6 and 9 is equal to 3 in lieu of 1. Consequently, there is optimum adaptation for these two phases, but the adaptation may be far from optimum for the remaining phases, so that the error may continue to be large.

If the measures according to the invention are implemented, it appears that all the phases of the cyclostationary signal have an effect on the adaptation process. For example, let us consider the case where m is equal to 3 and n is equal to 4 (greatest common divisor of 3 and 4 equals 1).

Assuming that at a given instant a sampling instant T coincides with the first phase of the cyclostationary signal, the sampling instant (n+1)T will coincide with the phase (0+4) mod 3=1. The sampling instant (n+2)T will then coincide with the phase (1+4) mod 3=2. The sampling instant (n+3)T will then coincide with the phase (2+4) mod 3=0. From this it appears that now all the phases of the cyclostationary signal do have an effect on the adaptation process.

A first embodiment of the invention is characterized, in that the characteristic quantity comprises intersymbol interference present in the input signal.

When digital symbols are transmitted by way of a transmission medium or stored on a recording medium, the digital symbols to be transmitted or recorded respectively, are converted into analog pulses which are successively applied to the transmission or recording medium respectively.

Generally, the pulses will not overlap in time. If the medium has a limited bandwidth, the pulses will start to overlap, which in many cases will lead to the fact that a signal sample received at a specific instant does not only depend on a single digital symbol but also on digital symbols adjacent in time. This effect is called intersymbol interference.

The presence of intersymbol interference will in many cases lead to an increased bit error rate.

A possibility of reducing the increased bit error rate which increase is caused by intersymbol interference, is the use of an equalization filter that has a transfer function which is approximately inverse to the medium transfer function. By cascading this filter and the medium, an approximately flat transfer characteristic is obtained, so that the intersymbol interference disappears.

Another possibility of reducing intersymbol interference is the use of a decision feedback intersymbol interference canceller. On the basis of decisions made with respect to already received data symbols, a cancelling signal is subtracted in the canceller from the newly received signal samples, which cancelling signal is obtained by feeding the decisions made to an equalization filter which has an impulse response representative of the intersymbol interference originating from one pulse.

In both preceding cases the input signal characteristic quantity (=intersymbol interference) to be estimated is represented by the parameter(s) of the filter which is to cancel the intersymbol interference.

Various methods are known of deriving from the received signal the error and thus the estimate of the correct parameters of the equalization filter. These known methods are described, for example, in the book entitled "Digital Communication" by E. A. Lee and D. G. Messerschmitt, Kluwer Academic Publishers 1990.

If this adaptation is performed with the aid of an adaptive system according to the state of the art, it may happen that if the input signal is cyclostationary, not more than a limited number of phases of the cyclostationary signal have an effect on the adaptation process. In this application this may result in the fact that the transfer function of the equalization filter continues to deviate considerably from the transfer function of the medium, so that a considerable amount of intersymbol interference continues to occur, which results in an enhanced error probability.

A second embodiment of the invention is characterized, in that the error determining means are also supplied with a signal to be transmitted and in that the characteristic quantity comprises an echo of the signal to be transmitted.

In full duplex data transmission it often happens that the input signal of the data receiver of a station includes an echo of the signal transmitted by the relevant station in addition to the received signal.

In full duplex transmission over telephone lines this echo is also caused by cross talk of the hybrid circuit as explained hereinbefore.

This echo may be cancelled in known manner by means of an adaptive echo canceller. For this purpose, the symbols to be transmitted are applied both to a transmission line and to an adaptive filter which generates an estimate of the echo signal on the basis of the symbols to be transmitted. This estimate of the echo signal is subtracted from the received signal, so that a signal substantially free from echoes is obtained.

An important quality standard of an echo canceller is the residual value of the echo signal once the echo canceller has been adapted. Echo cancellers often comprise a transversal adaptive filter whose coefficients are adapted with the aid of the LMS (least mean square) algorithm.

For the mean squared residual signal, it then approximately holds:

$$\epsilon^2 = \mu \cdot M \cdot \sigma_n^2 \quad (1)$$

In (1) $\mu$ is the adaptation constant of the LMS algorithm, M is the number of delay elements of the transversal filter and $\sigma_n^2$ is the power of noise or other noise-like interfering signals such as, for example, cross talk at the input of the adaptive filter. The LMS algorithm and the structure of transversal filters are described in aforementioned title by Lee and Messerschmitt.

If the interfering signal is mainly constituted by cross talk and if also the line signals are cyclostationary due to the correlation between successive symbols, the interfering signal will also be cyclostationary. If the coefficients of the transversal filter are adapted according to the state of the art, it may happen that only the phases of this cyclostationary interfering signal are sampled which have the largest mean power, so that $\sigma_n^2$ will be greater than when also other phases are sampled. This results in a larger value of the residual $\epsilon^2$ than possible.

If the adaptation is made according to the invention, the power of the interfering signal is averaged over a number of cyclostationary periods which results in a lower mean interfering signal power due to which the value of the residual signal will be lower.

A third embodiment of the invention is characterized, in that the characteristic quantity comprises the positions of the sampling instants for which there is a minimum probability of erroneous symbol detection. Here the influence of interfering signals is manifested in the form of phase and frequency jitter in the phase and frequency estimates of the received signal. The mean squared jitter is proportional to the power of this interfering signal. According to a similar line of reasoning as used for echo cancellation, it holds that when the invention is applied, phase jitter will be smaller than when the cyclostationary interfering signal is sampled at phases where there is a maximum mean power.

BRIEF DESCRIPTION OF THE DRAWINGS

The invention will now be further explained with reference to the drawing Figures, in which.

DETAILED DESCRIPTION OF THE PREFERRED EMBODIMENTS

Figure 1:
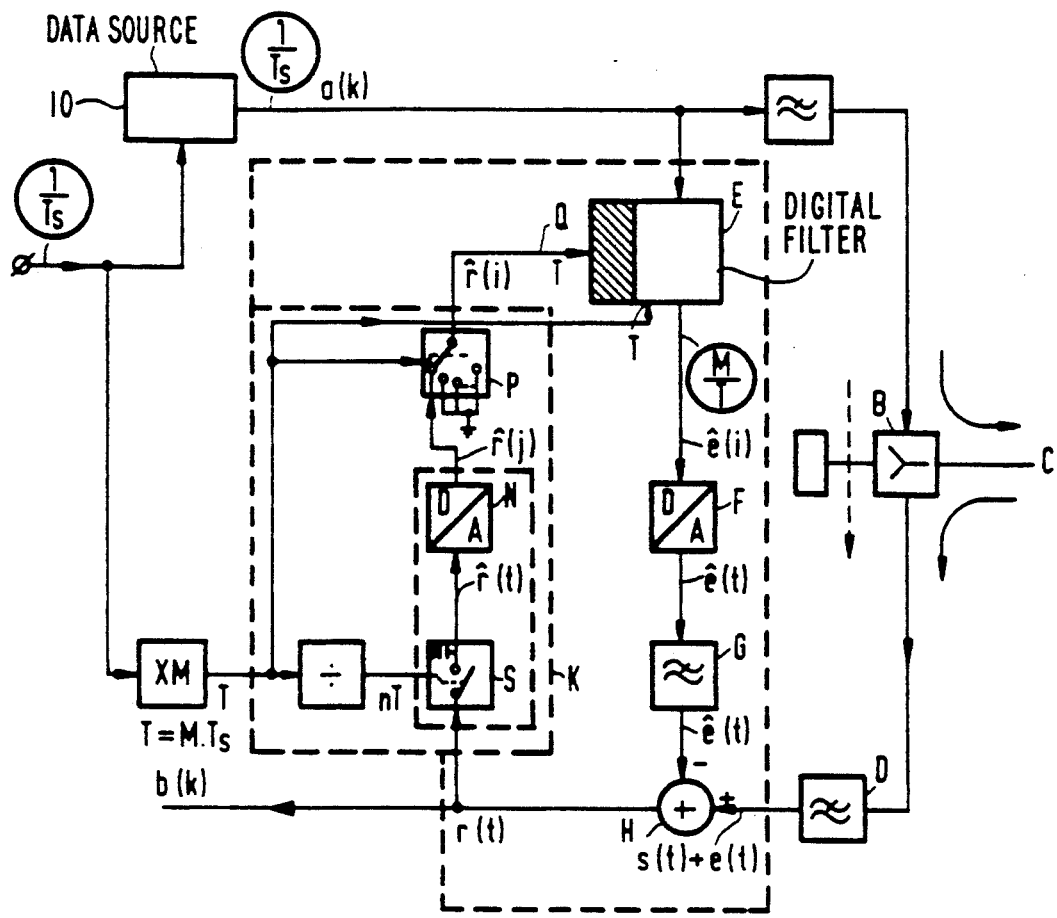
FIG. 1 is a block diagram of a known receiver.
Figure 2:
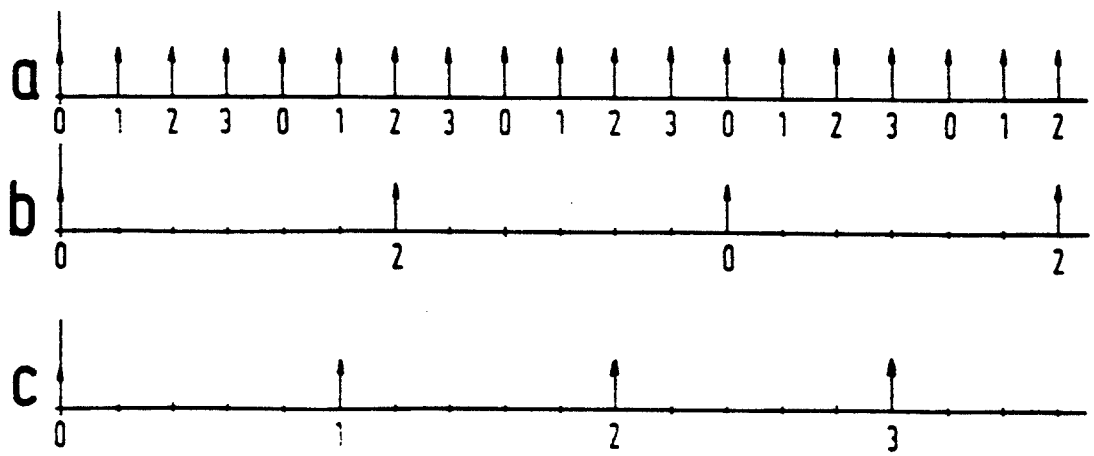
FIG. 2 shows discrete-time signals occurring when a cyclostationary signal is sampled according to the state of the art and according to the invention.

FIG. 2-a shows symbol intervals of a cyclostationary input signal. In this example the input signal has a cyclostationary period of 4 times the symbol interval (m=4). In FIG. 2-a four different possible phases of the cyclostationary signal are denoted 0, 1, 2 and 3.

FIG. 2-b shows the instants at which the error is transferred to the adapting means. In this example the error transfer takes place every sixth symbol interval (n=6). FIG. 2-b shows that the error transfer takes place alternately at the phases 0 and 2, so that the errors at phases 1 and 3 have no effect on the estimate of the characteristic properties of the input signal.

FIG. 2-c shows the instants at which the error is transferred to the adapting means, these instants being selected in accordance with the innovative concept. In this example the error transfer takes place every fifth symbol interval (n=5). FIG. 2-c shows that the error transfer takes place alternately at the phases 0, 1, 2 and 3, so that the error of all the phases have an effect on the estimate of the characteristic quantity of the input signal.

Figure 3:
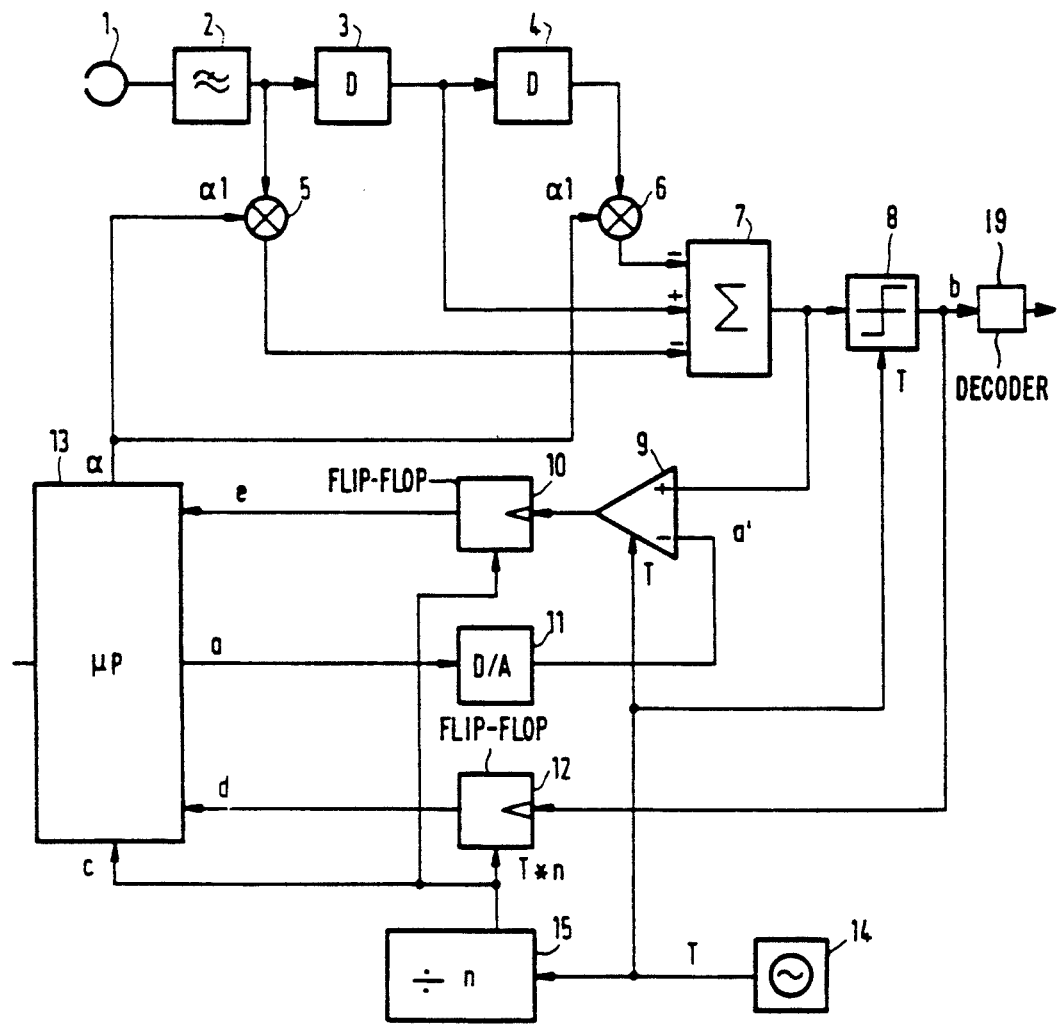
FIG. 3 shows a block diagram of an adaptive equalizer in which the parameters of the equalization filter are adapted according to the invention.

In the equalizer as shown in FIG. 3 the output of a reproducing head 1 is connected to the input of a low-pass filter 2. The output of the low-pass filter 2 is connected to the input of an adaptable attenuator 5 and an input of a delay element 3. The output of the delay element 3 is connected to the input of a delay element 4 and a positive input of an adder circuit 7. The output of the delay element 4 is connected to an input of an attenuator 6. The output of the attenuator 5 is connected to a first negative input of the adder circuit 7. The output of the attenuator 6 is connected to a second negative input of the adder circuit 7.

The output of the adder circuit 7 is connected to an input of a decision circuit 8 and a positive input of a comparator 9. The output symbols b(k−1) are available at the output of the decision circuit 8. The output of the decision circuit 8 is also connected to the input of a flip-flop 12. Also shown connected at the output of the decision circuit 8 is a conventional decoder 19 which functions in the usual way to obtain digital samples from the output signal of the decision device, i.e., the decoder 19 performs the inverse operation of the coder present in the transmitter. See, for example, Pg. 153 of "Digital Communication" referenced above.

The output of the comparator 9 is connected to an input of a flip-flop 10. The output of the flip-flop 10 carrying output signal e is connected to a first input of a microprocessor 13. The output of the flip-flop 12 carrying output signal d is connected to a second input of the microprocessor 13. A first output of the microprocessor 13 carrying output signal a is connected to a digital-to-analog converter 11. The output of the digital-to-analog converter 11 is connected to the negative input of the comparator 9. A second output of the microprocessor 13 carrying output signal $a_1$ is connected to a control input of the attenuator 5 and a control input of the attenuator 6.

The output of a clock oscillator 14 is connected to a clock input of the decision circuit 8, a clock input of the comparator 9 and a clock input of a frequency divider 15 having a dividend n selected in accordance with the innovative concept. A first output of the frequency divider 15 is connected to the clock input of the flip-flop 10. A second output of the frequency divider 15 is connected to the clock input of the flip-flop 12 and an interrupt input of the microprocessor 13.

The adaptive system as shown in FIG. 3 is used in a digital video recorder with an effective data transmission rate of 64 Mbit/s. For obtaining a DC-free signal to be recorded on a magnetic medium, the signal to be recorded is converted by means of a so-called "Miller-squared" channel code into a signal which is fed to the write head of the recorder. For this purpose, an input bit is converted into two output bits, so that the transmission rate on the channel is 128 Mbit/s. The "Miller-squared" code is described, for example, in the journal article entitled "A Partial-Response Receiver for Miller-Squared Encoded Signals with Half the Usual Operating Speed" by J. W. M. Bergmans in IEEE Transactions on Magnetics, Vol. 26, No. 5, September 1990.

When a signal recorded on a tape is reproduced, the signal coming from the reproducing head 1 shown in the circuit of FIG. 3 is filtered by means of a preequalization filter. This filter eliminated the intersymbol interference that occurs under normal channel conditions. This filter furthermore cancels the noise situated outside the pass band of the medium.

The error determining means are formed in this case by an adaptive transversal equalization filter constituted by the delay elements 3 and 4, the attenuators 5 and 6, the adder circuit 7, the D/A converter 11, the comparator 9, the flip-flop 10 and by part of a programme for the microprocessor 13 which part calculates the error on the basis of the signals e and d. The adapting means are constituted by the microprocessor 13 which is suitably programmed for this purpose.

The output signal of the pre-equalization filter 2 is fed to the adaptive equalization filter 3, 4. Due to the high transmission rate, the pre-equalization filter 2 as well as the adaptive equalization filter are constituted by analog circuits. Ideally, the output signal of the adder circuit 7 is free from intersymbol interference, so that the decision circuit 8 is able to make a correct decision about the logic value of the received symbol. The symbol $b(k-1)$ is then available at the output of the decision circuit 8. This symbol remains available until the decision about the next symbol is made.

Clock generator 14 produces a clock signal with the correct frequency and phase to make the decision about the received symbol at the proper instant. At the same instant the comparator 9 compares the input signal of the decision circuit with a reference value coming from a D/A converter 11. This reference value is an estimate of the mean amplitude of the input signal of the decision circuit at the decision instants.

The output signal of the comparator 9 is representative of the sign of the difference between the amplitude of the input signal of the decision circuit 8 and the reference voltage, this difference being a measure of the residual symbol interference. However, this only holds for positive values of the input signal of the decision circuit, so that only in that case the output signal of the comparator 9 may be used for adapting the properties of the adaptive equalization filter. By using the output signal of flip-flop 10 for adapting the coefficients of the transversal filter only when the received symbol shows a positive value, it is not necessary now to determine the absolute value of the input signal of the decision circuit, which means a saving on complexity.

The clock signal may be derived in known fashion from the received signal. This is described, for example, in afore-mentioned title by Lee and Messerschmitt.

For conveying both the output signal of the comparator 9 and the output symbol of the decision circuit 8 to the adapting means only at the sampling instants nT, the frequency divider 15 derives from its input signal a clock signal that has a frequency lower by a factor n. The associated input signals of the flip-flops 10 and 12 are stored on the basis of this clock signal. Flip-flop 10 accommodates the signal sign[e(k)] and flip-flop 12 the signal sign[d(k−1)], where the function sign(x) is equal to +1 for a positive argument and equal to −1 for a negative argument.

Since the cyclostationary period m of the output signal of the reproducing head 1 is equal to 2, the requirement is satisfied according to the innovative concept if n is selected to have an odd value. For that matter, the GCD of an odd number and 2 is equal to 1. In the present embodiment n is equal to 1047. The clock signal n*T is also passed to the microprocessor 13 so as to announce that new data are present in the flip-flops 10 and 11.

The attenuation value of the attenuators 5 and 6 is set at an equal value $a_1$ by the microprocessor. This is effected because it is a known fact that the impulse response of the channel is symmetrically situated around the main pulse. The value of $a_1$ may assume 8 different values in this embodiment.

In the flow chart shown in FIG. 4 the numbered instructions have the connotations stated in the following Table:

| NUMBER | INSCRIPTION | CONNOTATION |
|---|---|---|
| 20 | START | The local variables are again invoked |
| 21 | H: = d | The variable H is made equal to the input signal d |
| 22 | H = +1 | It is verified whether variable H is equal to +1 |
| 23 | SUME: = SUME + e | The input signal e is added to SUME |
| 24 | N: = N + 1 | The variable N is incremented by unity |
| 25 | N = 256 | It is verified whether N is equal to 256 |
| 26 | $a: = a + \mu \cdot$ SUME | The new value of $a$ is calculated |
| 27 | $a_1: = Q(a)$ | The value of $a$ is quantized |
| 28 | a: = a + Θ · e | The new value of a is calculated |
| 29 | N: = 0  SUME: = 0 | The variables N and SUME are made equal to 0 |
| 30 | RETURN | The interrupt routine is left and all local variables are again stored |

Figure 4:
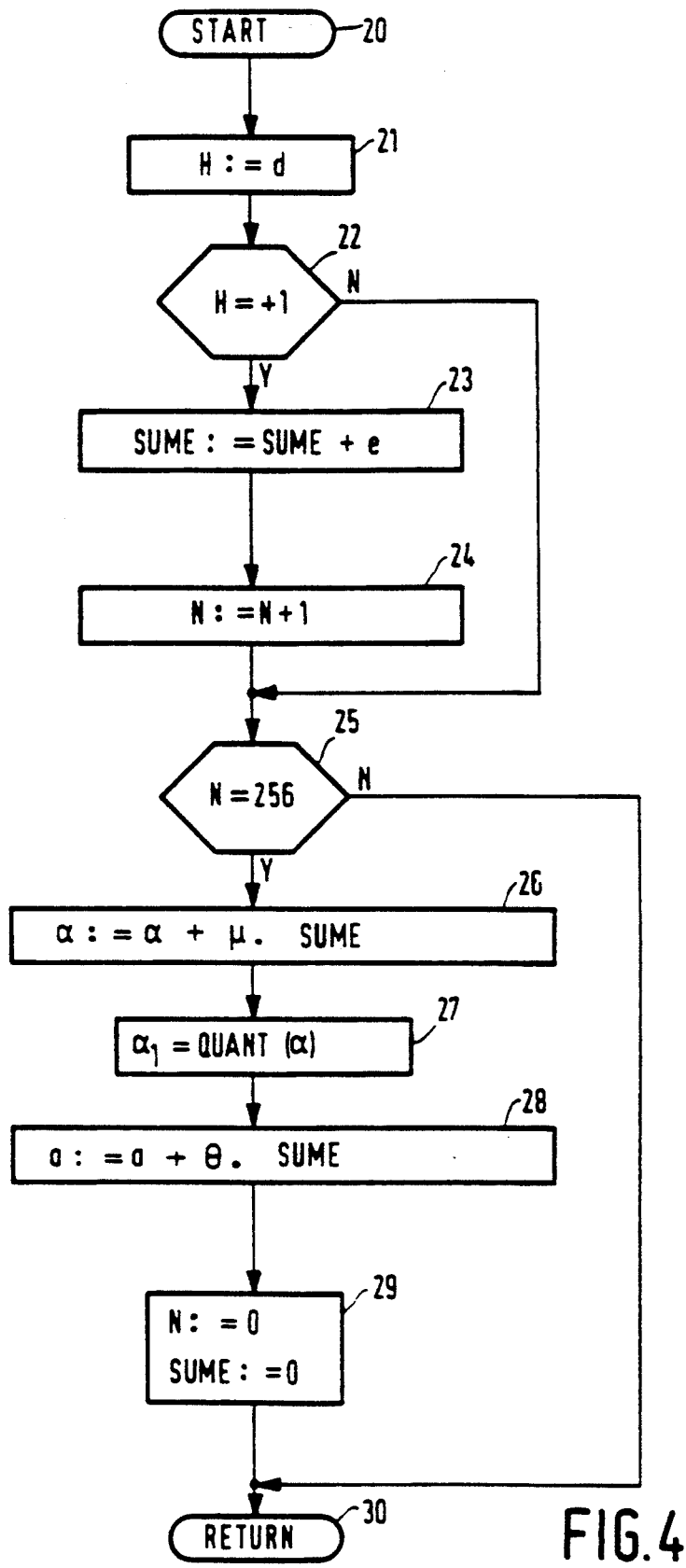
FIG. 4 shows a flow chart of a programme for the microprocessor in the circuit shown in FIG. 3 for adapting the equalizer coefficients.

The programme shown in the flow chart of FIG. 4 is started if a pulse is applied from the frequency divider to the input c of the microprocessor, so as to show that new information is available in the flip-flops 10 and 11.

It is assumed that the programme shown in FIG. 4 is executed on an interrupt base. In instruction 20 all the local variables used are again invoked. In instruction 21 the value of the input signal d is read by the microprocessor and assigned to the variable H.

In instruction 22 it is verified whether H is equal to +1. As already explained hereinbefore, only in that case does the signal e carry the sign of the difference between the amplitude of the input signal of the decision circuit 8 and the reference voltage a'. If H is equal to +1, e is a measure of the error in the characteristic value $\alpha$ and in instruction 23 the value of this input signal e is added to the variable SUME. In instruction 24 the value of N is incremented by unity. If in instruction 22 H appears to be unequal to +1, the end of instruction 24 is proceeded to.

In instruction 25, N is compared with 256. If N is equal to 256, the variable SUME contains the sum of 256 samples of the signal e belonging to a received symbol having symbol value +1. By determining the sum of the error signals, the influence of noise and other interfering signals on this mean signal is reduced. The summation of the number of error signals in adaptive systems for the purpose of reducing the effect of noise is described, for example, in the journal article entitled "Techniques for Adaptive Equalization of Digital Communication Systems" by R. W. Lucky in The Bell System Technical Journal, February 1966.

If N is equal to 256, the new value of $\alpha$ is determined in instruction 26. This is effected according to the so-called sign algorithm derived from the LMS algorithm. Both the LMS algorithm and the sign algorithm are described in the journal article entitled "Comparison of the convergence of two algorithms for adaptive FIR digital filters" by T. A. C. M. Claasen and W. F. J. Mecklenbräuker in IEEE Transactions on Circuits and Systems, CAS-28, No. 6, June 1981, pp. 510–518.

In instruction 27 the value of $\alpha$ is quantized to one of the 8 possible values.

In instruction 28 the value of the reference signal a is adapted. This is effected by adding to the former value of a, a fraction equal to the product of the adaptation constant $\theta$ and a mean value of the signum function of e. In that case e is the difference between the amplitude of the input signal of the decision circuit 8 in FIG. 3 and the former value of a, so that the value of a is adapted in the direction of the amplitude of the input signal of the decision circuit 8.

After this adaptation, the values of the variables N and SUME are again made equal to 0 in instruction 29, so that at a later instant again a next sum of 256 values of e can be determined.

If, in instruction 25, the value of N is unequal to 256, the beginning of instruction 30 is directly proceeded to. In instruction 30 the local variables are again stored to be used when the interrupt routine is invoked at a later instant.

Figure 5A:
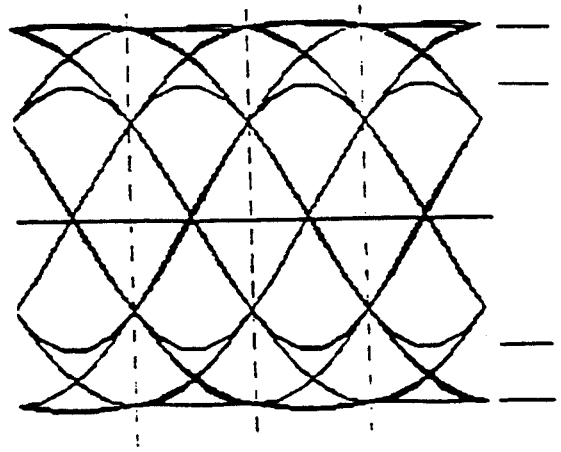
FIGS. 5a–5c shows eye patterns which occur when the parameters of the equalization filter are adapted according to the state of the art and according to the invention.
Figure 5B:
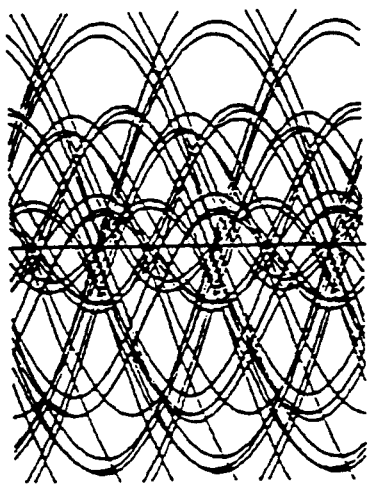
Figure 5C:
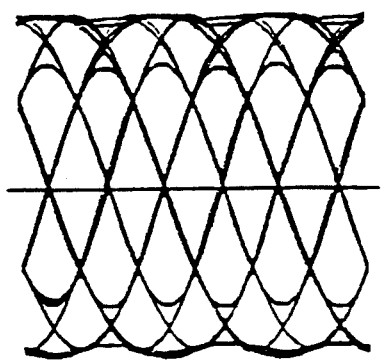

FIG. 5 shows various eye patterns which may occur when a "Miller-squared" code is used. FIG. 5-a shows the eye pattern for a "Miller-squared" code for an ideal channel without intersymbol interference, noise or other interfering signals. The optimum instants at which a decision about the value of the received symbol may be made are shown in dotted lines.

FIG. 5-b shows a simulated eye pattern for a "Miller-squared" code, which pattern occurs when a signal is reproduced with the aid of the circuit shown in FIG. 3 in which the channel exhibits an 8 dB attenuation at the Nyquist frequency $\frac{1}{2}T$ subsequent to pre-equalization. The factor n was equal to 1048 in this case. FIG. 5-b shows that the eye pattern is fully closed due to which no correct symbol detection is possible. This is a result of the fact that for a given value of n only half the phases of the cyclostationary input signal have an effect on the adaptation of the adaptive equalization filter.

FIG. 5-c shows the eye pattern which occurs if n is selected to be equal to 1047 under furthermore unchanged conditions. FIG. 5-c distinctly shows that the eye pattern is well open, so that in this case a correct symbol detection is indeed possible.

Figure 6:
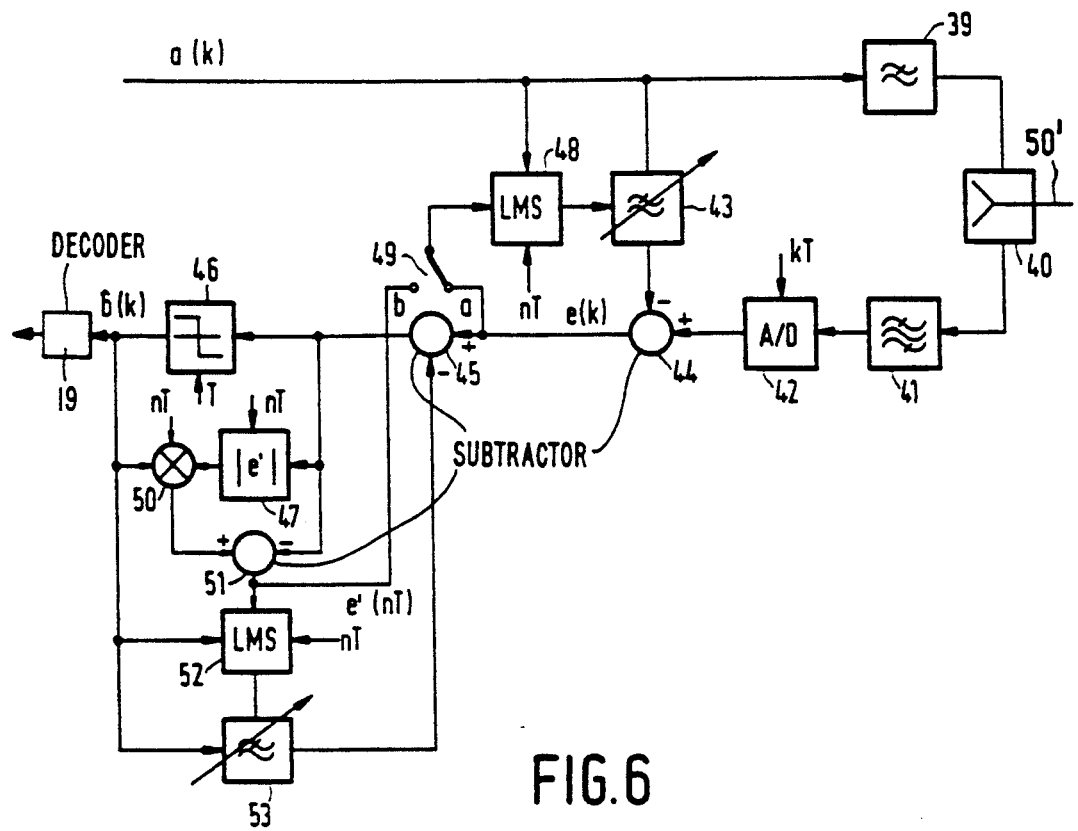
FIG. 6 shows an echo canceller comprising a decision feedback equalizer in which the coefficients of the adaptive filter are adapted according to the invention in the echo canceller.

FIG. 6 shows a data receiver comprising an adaptive echo canceller and an adaptive decision feedback intersymbol interference canceller. The digital symbols a(k) to be transmitted are applied to the input of a send filter 39, to the input of an adaptive filter 43 and to an input of LMS circuit 48. The output of the send filter 39 is connected to an input of a hybrid circuit 40.

A combined in/output of the hybrid circuit 40 is connected to a transmission line 50'. A further output of the hybrid circuit 40 is connected to a receive filter 41. The output of the receive filter 41 is connected to an input of an analog-to-digital converter 42. The output of the analog-to-digital converter 42 is connected to a positive input of a first subtractor circuit 44. The output of the adaptive filter 43 is connected to a negative input of the first subtractor circuit 44.

The output of the first subtractor circuit 44 is connected to a positive input of a second subtractor circuit 45 and a contact a of a change-over switch 49. The output of the subtractor circuit 45 is connected to the input of a decision circuit 46, the input of an amplitude detector 47 and a negative input of a subtractor circuit 51.

The output of the decision circuit 46 is connected to a first input of a multiplier circuit 50, a first input of adapting means 52 and the input of a controllable feedback filter 53. The output of the amplitude detector 47 is connected to a second input of the multiplier circuit 50. The output of the multiplier circuit 50 is connected to a positive input of the subtractor circuit 51. The output of the subtractor circuit 51 is connected to a second inout of the LMS circuit 52 and a contact b of the switch 49. The output of the LMS circuit 52 is connected to a control input of the feedback filter 53. The output of the feedback filter 53 is connected to a negative input of the subtractor circuit 45. A clock signal having period T is applied to the decision circuit 46 and to the feedback filter 53. A clock signal having period nT is applied to the LMS circuit 48, the amplitude detector 47, the multiplier 50 and the LMS circuit 52.

In the circuit as shown in FIG. 6 the symbols to be transmitted are fed to the transmission line 50' through the filter 39 and the hybrid circuit 40. The filter 39 converts the data symbols into an analog signal suitable for transmission over the transmission line. The signal coming from the transmission line is transferred to the input of the A/D converter 42 by way of the receive filter 41. The hybrid circuit 40 is used for enabling full duplex transmission over a two-wire line. The receive filter has for its object to remove interfering signals situated outside the relevant pass band. The A/D converter 42 converts the analog input signal at its input into a digital signal, so that a further digital signal processing can be effected.

Due to leakage of the hybrid circuit, an echo of the send filter output signal will also be present at the input of the receive filter. This echo may even be stronger than the signal received from the remote end.

In addition to the echo, the input signal will also include undesired intersymbol interference. For cancelling echo signals as well as intersymbol interference, two adaptive systems according to the invention are present. If the switch 49 is in state a, the error determining means of the adaptive echo cancelling system are formed by the filter 43, the subtractor circuit 44 and the part of the LMS circuit that calculates the error in the signals e(k) and a(k). The adapting means of this adaptive system are then formed by the rest of the LMS circuit 48. For removing the echo signal, the adaptive filter 43 produces a replica of the echo signal, which replica is subtracted from the output signal of the A/D converter 42 with the aid of the subtractor circuit 44, so that a substantially echo-free output signal is available at the output of the subtractor circuit. This output signal is the residual signal. The error is determined and the parameters of the filter 43 adapted on the basis of the residual signal and the transmitted symbols b if the switch 49 is in state a. In the case where the filter 43 has more than one adjustable parameter, it is necessary to calculate more errors on the basis of the residual signal and the transmitted symbols a.

If the switch 49 is in state b, the signal e' is used instead of signal e.

For cancelling the intersymbol interference present in signal e, a second adaptive system is available. The error determining means then comprise a decision circuit 46, the multiplier circuit 50, the amplitude detector 47, the subtractor circuit 51 and the part of the LMS circuit that determines the error on the basis of the symbols $\tilde{b}$(k) and the signal e'. The adapting means here comprise the rest of the LMS circuit 52.

The adaptive system is in this case a decision feedback equalizer. Applying the received symbols to the feedback filter 53, which has an impulse response that is an estimate of the impulse response of the transmission channel, provides an estimate of the total intersymbol interference. Subtracting this estimate from the signal e(k) by means of the subtractor circuit 45 provides a signal that is substantially free from intersymbol interference. The signal e' is now determined by calculating the difference of a reconstructed data signal of the decision circuit 46 and the input signal of the decision circuit 46. This difference is determined by the subtractor circuit 51. The reconstructed data signal is determined by multiplying the amplitude of the input signal to the decision circuit by the symbol value. This is effected by means of multiplier circuit 50. The amplitude of the input signal of the decision circuit 46 is detected with the aid of the amplitude detector 47. Detection of the amplitude of the input signal may also be realised in a manner described in published European Patent Application EP 4 157 598.

When reception is started, switch 49 will be in state a. The residual signal for the LMS circuit now contains the signal transmitted from the remote end, a residual signal of the echo signal, intersymbol interference and interfering signals of which cross talk of signals from adjacent wire pairs is the most important one when transmission is effected over telephone lines. The LMS circuit 48 is supplied with a clock signal with period nT, supplied for causing the LMS circuit to take over signal e only once per nT seconds. The multiplier circuit 50, the amplitude detector 47 and the LMS circuit 52 are supplied with a clock signal with a period nT, for calculating the signal e' not more than once per nT seconds and for causing the LMS circuit to adopt this signal.

After a period of time both adaptive filters will have converged and the switch 49 may be moved to state b. The input signal of the LMS circuit 48 now contains only a residual signal of the echo signal, a residue of the intersymbol interference and the further interfering signals, so that this signal is more suitable than signal e for adapting the parameters of the adaptive filter 43. Selecting a different residual signal for echo cancellation during and after the convergence time of an echo canceller is known from the journal article by D. D. Falconer, entitled "Adaptive Reference Echo Cancellation", IEEE Transactions on Communications, COM-30, No. 9, September 1982.

If the codes used lead to cyclostationary data signals having a cyclostationary period mT, the cross talk signal will also be cyclostationary with the same cyclostationary period m, because an identical code is used on adjacent wire pairs. This cyclostationarity leads to the fact that the power of the interfering signal becomes dependent on the clock phase with which the input signal is sampled. If the error is conveyed not more than every nT periods, it is possible that not more than several or even not more than a single phase of the interfering signal is conveyed to the adapting means 48. If the power of the interfering signal happens to be maximum at this phase, this will enlarge the residual value of the echo signal as already shown in the formula (1).

However, if n is selected in accordance with the innovative concept, all the phases of the cyclostationary interfering signal are dealt with, so that the power of the interfering signal will never be maximum, but always adopt the value averaged over all the phases.

The Table below shows the ratio of the maximum value of the cross talk signal power to the mean value of the cross talk signal power for a plurality of known transmission codes.

These values are determined by means of simulations, the channel model and cross talk model used being described in ANSI standard T1.601-1988 Integrated Services Digital Network, Basic Access Interface for use on metallic loops for application on the network side of the NT-layer 1 specification. The values are given for both state a and state b of switch 47.

| CODE | 2B2T | 2B2TA | PST | MS43 | 4B3T | FOMOT |
|---|---|---|---|---|---|---|
| PER. CYCL. ST. | 2 | 2 | 2 | 3 | 3 | 3 |
| ΔP state a (dB) | 2.2 | 2.2 | 1.5 | 0.7 | 0.1 | 0.5 |
| ΔP state b (dB) | 0.8 | 0.8 | 1.7 | 1.4 | 0 | 0.4 |

The 2B2T and the 2B2TA code are described in the journal article entitled "Two new ternary line codes" in Electronics Letters, Vol. 26, No. 24, November 1990. The PST code, the MS43 code, the 4B3T code and the FOMOT code are described in the journal article entitled "line Coding for Digital Data Transmission" in Austral. Telecommun. Res., Vol. 11, No. 2, 1977.

The simulation results show that depending on the code used, a reduction of the residual error of the echo canceller by several tenths of dBs to several dBs is possible when the invention is used. For the codes having a cyclostationary period equal to two, according to the innovative idea n is to be selected to have an odd value. For the codes having a cyclostationary period equal to three, according to the innovative idea n is to be selected to have a value which is not dividable by 3.

Figure 7:
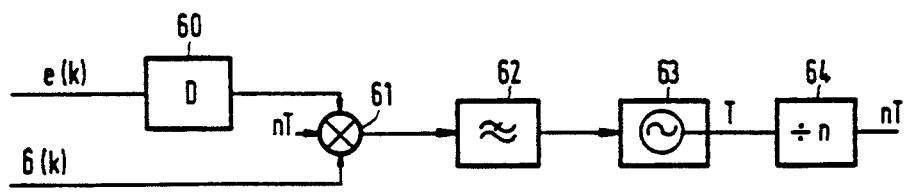
FIG. 7 shows a circuit for generating a clock signal to be used in a receiver as shown in FIG. 6 by means of a system according to the invention.

In FIG. 7 the signal e' of FIG. 6 is applied to a delay element 60 having a delay T. The output of the delay element 60 is connected to a first input of a multiplier circuit 61. The received symbol b of FIG. 6 is applied to a second input of the multiplier circuit 61. The output of the multiplier 61 is connected to the input of a low-pass filter 62. The output of the low-pass filter 62 is connected to a control input of a frequency-controlled oscillator 63. The output of the frequency-controlled oscillator 63 having an output signal with period T is connected to the input of a frequency divider 64. This frequency divider has an output signal which has a period nT.

In the circuit shown in FIG. 7 it is assumed that the filter 41 (FIG. 6) forces a zero crossing in a received pulse belonging to a single symbol, which zero crossing is situated at an instant T before the instant at which a decision about the value of a symbol belonging to that pulse is made. This zero crossing then makes it possible to implement the so-called precursor synchronization method. This method narrows down to the fact that the product $e(k-1)b(k)$ is a value for the difference of the sampling instant kT relative to the ideal sampling instant. The precursor synchronization method is further discussed in Dutch Patent Application 8800490 (PHE 88002) laid open to public inspection.

The delay circuit (60) produces the signal $e'(k-1)$. By multiplying this signal by the symbol value $b(k)$ with the aid of the multiplier circuit 61, the error in the sampling instant kT is obtained. This multiplication is performed not more than once per n sampling instants, while n is selected according to the innovative idea.

The error thus obtained is averaged by the filter 62 and subsequently applied to a control input of a frequency-controlled oscillator 63 for adapting the sampling instants. The frequency and phase of the output signal of the oscillator 63 form the estimate of the characteristic quantities (optimum sampling frequency and phase) of the input signal.

For cyclostationary interfering signals having a cyclostationary period mT such as, for example, cross talk, it now also holds that the mean squared phase jitter is proportional to the power in this interfering signal. If n is selected in such a way that the samples of the error are taken at phases of the cyclostationary interfering signals having a maximum power, the phase jitter in the clock signal is unnecessarily large. By selecting n according to the innovative idea, the power of the interfering signal is always equal to the mean value of all the phases. For the codes having a cyclostationary period equal to two, according to the innovative idea an odd value is to be selected for n in this case too. For the codes having a cyclostationary period equal to three, according to the innovative idea also in this case a value not dividable by 3 is to be selected for n. The improvement to be realised for a number of transmission codes may be read from the Table below.

| CODE | 2B2T | 2B2TA | PST | MS43 | 4B3T | FOMOT |
|---|---|---|---|---|---|---|
| PER. CYCL. ST. | 2 | 2 | 2 | 3 | 3 | 3 |
| Δ Phase jitter | 2.2 | 2.2 | 1.5 | 0.7 | 0.1 | 0.5 |

| CODE (dB) | 2B2T | 2B2TA | PST | MS43 | 4B3T | FOMOT |
|---|---|---|---|---|---|---|

I claim:

1. Data receiver comprising:
   a) an input coupled to receive a data signal having data symbols occurring at a rate of 1/T symbols/sec., wherein T is a rational fraction ($\leq 1$) of an interval between received symbols of the data signal,
   b) an adaptive system for estimating at least one measure of a characteristic quantity of the data signal applied to the input of the data receiver, said adaptive system comprising:
      i) error determining means for determining an error in the estimate of the measure of the characteristic quantity of the data signal, said error determining means having first and second inputs and an output;
      ii) adapting means for adapting at discrete instants the estimate of the measure of the characteristic quantity of the data signal, said adapting means having an input and an output;
      iii) means connecting the input of the data receiver to the first input of the error determining means;
      iv) means coupling the output of the error determining means to an input of the adapting means for periodically conveying thereto the error with a period nT, where n is an integer;
      v) means coupling the output of the adapting means to the second input of the error determining means, the signal at said output of the adapting means forming the measure of the characteristic quantity of the data signal, said adapting means functioning to adapt its output signal at discrete instants in order to minimize the error;
   c) said input signal to the data receiver giving rise to a cyclostationary data signal having a cyclostationary period mT, where m is an integer;
   d) the integer n being selected such that the greatest common divisor of n and m is equal to 1.

2. Data receiver as claimed in claim 1, characterized in that the characteristic quantity comprises intersymbol interference present in the input signal.

3. Data receiver as claimed in claim 1, characterized in that the error determining means are also supplied with a signal to be transmitted and in that the characteristic quantity comprises an echo of the signal to be transmitted.

4. Data receiver as claimed in claim 1, characterized in that the characteristic quantity comprises the positions of the sampling instants for which there is a minimum probability of erroneous symbol detection.

5. The data receiver of claim 1, wherein said data receiver has an output coupled to the adapting means, and further comprising a decoder connected to the data receiver output.

6. Adaptive system as claimed in claim 2, characterized in that the error determining means are also supplied with a signal to be transmitted and in that the characteristic quantity comprises an echo of the signal to be transmitted.

7. Adaptive system as claimed in claim 2, characterized in that the characteristic quantity comprises the positions of the sampling instants for which there is a minimum probability of erroneous symbol detection.

8. Adaptive system as claimed in claim 3, characterized in that the characteristic quantity comprises the positions of the sampling instants for which there is a minimum probability of erroneous symbol detection.

* * * * *